United States Patent
Le et al.

(10) Patent No.: US 7,110,364 B1
(45) Date of Patent: Sep. 19, 2006

(54) OPTICAL LINK ADJACENCY DISCOVERY PROTOCOL AND AN OPTICAL NETWORK THEREFOR

(75) Inventors: Tung Quang Le, Dallas, TX (US); James Alvah Spallin, Allen, TX (US); Mark Frank Vanderburg, Plano, TX (US)

(73) Assignee: Fujitsu Limited, (JP)

( * ) Notice: Subject to any disclaimer, the term of this patent is extended or adjusted under 35 U.S.C. 154(b) by 864 days.

(21) Appl. No.: 09/838,605

(22) Filed: Apr. 19, 2001

(51) Int. Cl.
*H04J 1/16* (2006.01)

(52) U.S. Cl. .................... 370/242; 370/249
(58) Field of Classification Search .......... 370/249, 370/254, 257, 258, 349, 400, 216
See application file for complete search history.

(56) References Cited

U.S. PATENT DOCUMENTS

| | | | | |
|---|---|---|---|---|
| 5,003,533 A * | 3/1991 | Watanabe | .................. | 370/258 |
| 5,303,235 A * | 4/1994 | Chan et al. | .................. | 370/254 |
| 5,506,838 A * | 4/1996 | Flanagan | .................. | 370/258 |
| 5,781,535 A * | 7/1998 | Russ et al. | .................. | 370/248 |
| 5,845,081 A * | 12/1998 | Rangarajan et al. | ......... | 709/224 |
| 5,892,753 A * | 4/1999 | Badt et al. | .................. | 370/233 |
| 5,933,425 A * | 8/1999 | Iwata | .................. | 370/351 |
| 6,163,527 A | 12/2000 | Ester et al. | | |
| 6,194,707 B1 * | 2/2001 | Yang | ............... | 250/227.15 |
| 6,246,669 B1 * | 6/2001 | Chevalier et al. | .......... | 370/238 |
| 6,381,643 B1 * | 4/2002 | Bartfai et al. | .............. | 709/224 |
| 6,574,208 B1 * | 6/2003 | Matturi et al. | ............. | 370/338 |
| 6,594,044 B1 * | 7/2003 | Buchanan et al. | ............ | 398/58 |
| 6,654,802 B1 * | 11/2003 | Oliva et al. | ................ | 709/224 |
| 6,735,215 B1 * | 5/2004 | Cao | .................. | 370/437 |
| 6,738,816 B1 * | 5/2004 | Momona | .................. | 709/226 |
| 6,757,297 B1 * | 6/2004 | Chin | .................. | 370/469 |
| 6,765,877 B1 * | 7/2004 | Foschiano et al. | ......... | 370/250 |
| 6,856,627 B1 * | 2/2005 | Saleh et al. | ................ | 370/397 |
| 6,952,396 B1 * | 10/2005 | Cottreau et al. | ............ | 370/222 |
| 6,975,587 B1 * | 12/2005 | Adamski et al. | ........... | 370/217 |

OTHER PUBLICATIONS

Postel, J., Internet Control Message Protocol, Sep. 1981, Internet Engineering Task Force (IETF), Network Working Group, RFC 792.*
World Wide Web, http://www.cis.ohio-state.edu/~jain/cis788-97/virtual_lans/index.htm, Suba Varadarajan, "Virtual Local Area Networks", printed on Feb. 7, 2000, 12 pages.

(Continued)

*Primary Examiner*—Andrew C. Lee
(74) *Attorney, Agent, or Firm*—Marc A. Hubbard; Gardere Wynne Sewell LLP

(57) ABSTRACT

An optical link adjacency discovery protocol is provided. The protocol includes a simple format that includes an identifier field of a local node and facility and an identifier field of an echo node and facility. An announce message, including a source field having an identifier of the local node written therein, is transmitted from the local node that terminates the created link to the far end node that terminates the other end of the optical link. The far end node receiving the announce message then generates an echo message including a source field and an echo field, the source field having an identifier of the second node and resources thereof associated with the link. The echo field of the echo message includes an identifier of the local node and resources thereof associated with the link. An optical network for implementing the optical link adjacency discovery protocol is also provided.

26 Claims, 2 Drawing Sheets

OTHER PUBLICATIONS

World Wide Web, http://www.ietf.org/internet-drafts/draft-ietf-mpls-arch-07.txt, Eric C. Rosen, "Multiprotocol Label Switching Architucture", printed on Jan. 9, 2001, 55 pages.

World Wide Web; http://www.ietf.org/internet-drafts/draft-ietf-mpls-generalized-rsvp-te-00Peter Ashwood-Smith, et al., "Generalized MPLS Signaling -RSVP-TE Extensions", printed on Jan. 9, 2001, 19 pages.

Yates, Jennifer, et al., "Reconfiguration in IP Over WDM Access Networks", AT&T Labs—Research, AT&T Shannon Laboratories, 4 pages.

Copyright 2000 by the Institute of Electrical and Electronics Engineers, Inc., "Local and Metropolitan Area Networks", IEEE Standard for Information technology, published Oct. 16, 2000, pp. 40-50.

\* cited by examiner

OPTICAL LINK ADJACENCY DISCOVERY PROTOCOL AND AN OPTICAL NETWORK THEREFOR

TECHNICAL FIELD OF THE INVENTION

This invention relates to optical link management in an optical network and, more particularly, to an optical link adjacency discovery protocol for facilitating network topology discovery.

BACKGROUND OF THE INVENTION

Optical link management is a critical component of network servicing and maintenance. In order for an optical link manager to be able to effectively establish and maintain optical links on network elements, the optical network topology must be known to the optical network manager. Optical links, and services provisioned thereon, may be provided once the network topology is known. In optical networks such as metropolitan and access optical networks, congestion in an optical channel may develop between two or more network elements or nodes. To alleviate the congestion, secondary or alternate optical links may be provisioned. However, to provide an optimal secondary or alternate optical links that results in the most efficient allocation of network resources, the optical network topology should be known to the one or more nodes of the network involved in provisioning of the optical link. For example, if a node involved in a optical link allocation could obtain information relating to adjacent nodes, optical links could accordingly be provisioned therewith. Mechanisms could then be implemented to allocate optical links based on the most optimal network topology that results from the various optical link configurations.

SUMMARY OF THE INVENTION

In accordance with an embodiment of the present invention, an optical link adjacency discovery protocol is provided. The protocol includes a simple format that includes an identifier field of a source node and facility and an identifier field of an echo node and facility. Upon an optical link initialization, an announce message is transmitted from the local node that terminates the created link to the far end node that terminates the other end of the optical link. The far end node receiving the announce message then transmits an identically formatted echo message to the local node. Optical link state transitions are also defined by the optical link adjacency discovery protocol.

In accordance with another embodiment of the present invention, an optical network for implementing the optical link adjacency discovery protocol is provided. Optical link manager modules executed in nodes of the optical network process messages made in accordance with the optical link adjacency discovery protocol. Link state transitions are made according to responses of far end nodes to messages provided by local nodes during link initializations.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1:
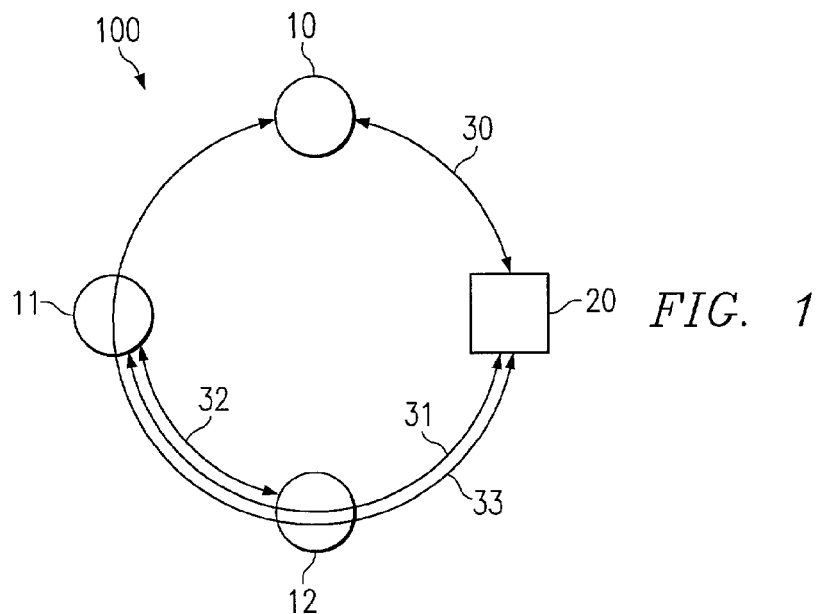
FIG. 1 is an exemplary optical ring network on which the present invention may be implemented.

In FIG. 1, there is illustrated an optical ring network 100 that generally includes one or more optical transport network nodes 10–12. The ring network may also include a optical transport network node 20 that facilitates interconnection of the optical ring network 100 to other optical network rings (not shown). An optical ring network is described herein for facilitating the description of the network topology discovery protocol and is not intended to limit the invention to implementation to a specific network architecture. For example, the protocol described herein may be implemented with advantage on mesh or point-to-point networks. Additionally, the protocol is not limited to optic networks and such a network is only described for illustrative purposes. The optical transport network nodes function to add, drop and modify optical links and provide conversion to and from electrical signals. Data and telephony signals may ingress and egress an optical ring network 100 at all optical transport network nodes 10–12 and 20, all of which are also referred to herein as "nodes". The optical topology from the perspective of each optical transport network nodes 10–12 and 20 is a map of the optical links terminating at the particular optical transport network nodes 10–12 and 20. Accordingly, each node maintains a local link adjacency map (LLAM) that maintains a set of records of the optical links of the node. Preferably, a LLAM is maintained in a memory module of each node 10–12 and 20 of the optical ring network 100. Each optical link has a one-to-one association with a lambda ($\lambda$), that is a particular optical communication channel or facility. Each optical link may be defined as a bi-directional segment of lambda bounded by an out-of-band signaling mechanism such as a Digital Wrapper (DW) terminator. However, an in-band signaling mechanism may be substituted therefor. The use of digital wrapper terminators is exemplary and other signaling mechanisms may be used. An optical link, therefore, is defined by its end points. The two terminating nodes, and accordingly the optical link, are referred to as adjacent nodes even though the link may pass through one or more pass through nodes.

Various exemplary optical links 30–33 are illustrated in FIG. 1. Optical link 30 terminates on nodes 10 and 20. Thus, nodes 10 and 20 are said to be "adjacent" over link 30. Similarly, nodes 11 and 20 are adjacent over link 31 even though the link 31 passes though node 12. Accordingly, node 12 is said to be a "pass through" node of link 31. Link 32 connects two nodes 11 and 12 and, accordingly, optical transport network nodes 11 and 12 are said to be adjacent over link 32. Another link 33 is terminated by nodes 10 and 20 and passes through pass through nodes 11 and 12.

Figure 2A:
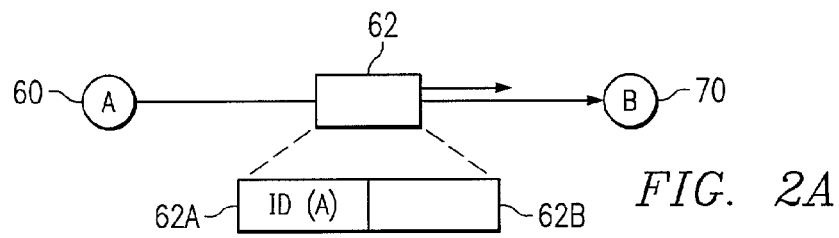
FIGS. 2A and 2B illustrate a generalized protocol for facilitating network topology discovery according to the present invention.

In FIG. 2A, there is illustrated two network nodes 60 and 70 that may be subject to a network topology discovery procedure facilitated by the protocol of the present invention. A node initiating communication by transmitting an announce message to another node is referred to herein as a local node and the node receiving the announce message, or transmitting an echo message, is referred to herein as the far-end node. Local node 60 transmits an announce message 62 to node 70. The announce message 62 is formatted according to the protocol taught herein and facilitates network topology discovery between the nodes 60 and 70. In the most general form, the protocol includes two fields 62A and 62B within the announce message 62 or echo message 64. An identifier (ID(A)) associated with the local node 60 is written into the first field, also referred to herein as a source field 62A, of the announce message 62. The second field, also referred to herein as an echo field 62B, of the announce message 62 is empty, for example zeroed, etc. The far-end node 70 receives the announce message 62 and reads the identifier included in the source field 62A.

Figure 2B:
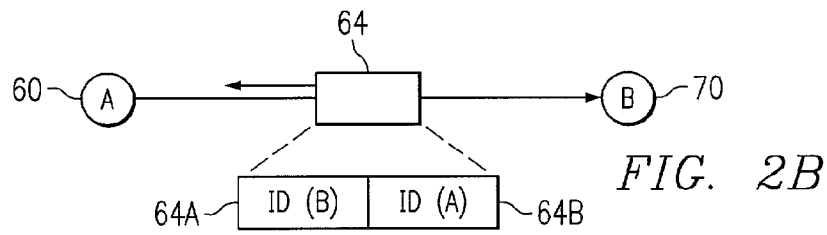

With reference now to FIG. 2B, the identifier of the local node 60 is read by the far-end node 70 from the announce message 62 and then written into an echo field 64B of an echo message 64 that is formatted identically to the announce message 62. An identifier (ID(B)) of the far-end node 70 is written into a source field 64A of the echo message 64 and then transmitted to the local node 60. The local node 60 reads the identifier (ID(B)) of the far-end node 70 upon reception of the echo message 64 as well as the identifier (ID(A)) carried in the echo field 64B of the echo message 64. The local node 60 can perform a comparison between the information contained in the identifier transmitted in the source field 62A of the announce message 62 with the information contained in the echo field 64B of the echo message 64—failure of a match in these data indicates a data loss or communication error between the local node 60 and far-end node 70.

The particular information contained within an identifier of a node that is written into a source or echo field of an announce or echo message may vary dependent on the specific type of network in which the nodes 60 and 70 are located. While the present invention contemplates implementation of the described protocol in an optical network, the protocol may provide advantages in various other data or communication networks. Thus, the description herein of an optical network and optical network nodes is illustrative only and is so chosen to facilitate the discussion and understanding of the invention and is not intended to limit the application of the invention to optical networks. Furthermore, the particular configuration of the nodes within the network is generally irrelevant with regard to the scope of the invention. The configuration of the nodes 60 and 70 as well as 80 and 90 (FIGS. 3A and 3B) are of a point-to-point network configuration. However, the protocol of the present invention may be implemented on various network configurations such as a ring network as illustrated in FIG. 1 or other various configurations such as mesh networks, etc.

Figure 3A:
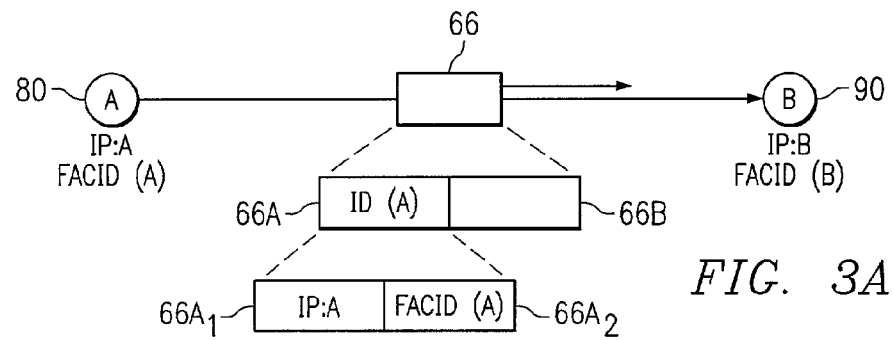
FIGS. 3A and 3B illustrate the protocol accommodating network nodes having network addresses and facility identifiers.
Figure 3B:
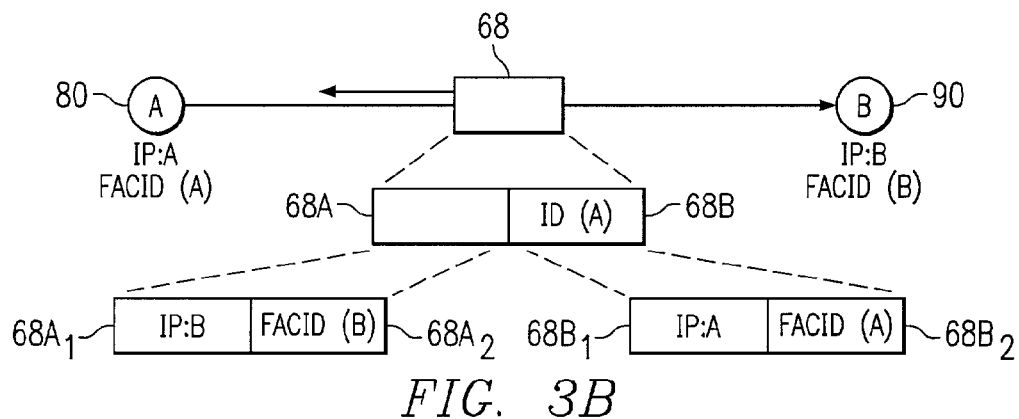

In FIGS. 3A and 3B, there is illustrated a more particular implementation of the protocol. The exemplary embodiment illustrated in FIGS. 3A and 3B may find particular advantage in an optical network 100. Each node 80 and 90 will generally have a unique network address for properly directing data transmissions thereto. For example, each node 80 and 90 may have an Internet Protocol (IP) address. In the present example, nodes 80 and 90 each have a respective IP address illustratively designated as A and B. Each node 80 and 90 will also have a respective logical channel or channel endpoint, also referred to herein as a facility and respectively designated as facID(A) and facID(B), associated with the application program responsible for performing communications therebetween, i.e. each node will have a port on which communications made in the described protocol are designated to be made on.

Local node 80 transmits an announce message 66 to node 90. The announce message 66 is formatted according to the protocol taught herein and facilitates network topology discovery between the nodes 80 and 90. In the most general form, the protocol includes two fields 66A and 66B within the announce message 66. An identifier associated with the local node 80 is written into the first field, also referred to herein as a source field 66A, of the announce message 66. In the particular implementation illustrated, the identifier includes the IP address (A) of node 80 as well as a port, or facility identifier (facID(A)), each respectively written into subfields $66A_1$ and $66A_2$ of the source field 66A. The second field, also referred to herein as an echo field 66B, of the announce message 66 is empty, for example zeroed, etc. The far-end node 90 receives the announce message 66 and reads the identifier, including the IP address and the facility identifier, included in the source field 66A.

With reference now to FIG. 3B, the identifier of the local node 80 is then written into an echo field 68B of an echo message 68 that is formatted identically to the announce message 66. The identifier of the local node preferably includes the IP address (A) and the port or facility identifier (facID(A)) of the local node 80 and is accordingly written into subfields $68B_1$ and $68B_2$ of the echo message 68. An identifier, including the IP address (B) of node 90 as well as a port or facility identifier (facID(B)) each respectively written into subfields $68A_1$ and $68A_2$ of the source field 68A, of the far-end node 90 is written into a source field 68A of the echo message 68 and then transmitted to the local node 80. The local node 80 reads the identifier of the far-end node 90 upon reception of the echo message 68 as well as the identifier carried in the echo field 68B of the echo message 68. The local node 80 can perform a comparison between the information contained in the identifier transmitted in the source field 66A of the announce message 66 with the information contained in the echo field 68B of the echo message 68 to identify a possible communication loss or error. Adjacency discovery that is facilitated by the above exchange of an announce message and an echo message between nodes 80 and 90 may also include transmission of a secondary echo message from the local node 80 to the far-end node 90 in response to reception of the original echo message by the local node 80. This secondary echo message will have an identical format as described above. In particular, the secondary echo message will include a source field and an echo field. As in the announce message and the echo message originating from the far-end node 90, the secondary echo message will include an identifier of the node transmitting the message, the local node 80 in this case, in the source field. The secondary echo message will also include an identifier of the receiving node in the echo field. Preferably, both of these identifiers will include the IP address and the port or facility associated with the respective node and node facility.

An optical link manager (OLM) module may be responsible for such functions as optical link provisioning, automatic discovery of optical link adjacencies, and management of the local link adjacency matrix. Preferably, each node of the optical ring network 100 includes such an OLM for provisioning, maintaining, managing and performing autodiscovery of optical link adjacencies for the respective nodes according to the teachings herein. An optical link manager (OLM) uses an optical link adjacency discovery (OLAD) protocol of the present invention to perform automatic discovery of the topology of the optical ring network 100. The OLAD protocol is a simple protocol that enables two end points, or nodes, to exchange link information. Thus, once the link is established, each end node knows the identity of the other end node. Preferably, each node of the optical ring network 100 supporting the OLAD protocol includes an OLM in the form of computer executable code for servicing the OLAD protocol. Accordingly, the OLM may be stored in a memory module of a node and executed by a central processing unit of the node.

The OLAD protocol is generally defined by two fields: a source field and an echo field to form two types of messages. An Announce message, including a source field and an echo field, is made when a local node, node A acting as an optical link source that provides a termination point for an optical link, initiates a discovery request by sending a link identifier (LinkID) associated with the local node in the source field to the far end node, node B, functioning as the second termination point of the optical link. An echo message, including a source field and an echo field, is generated when the far end node sends a response to the announce message back to the local node that contains a far end LinkID in the source field and the LinkID of the local node in the echo field. The local node may also send its own echo to the far end to complete the link once the far end echo message is received.

The OLM is responsible for establishing and maintaining optical links on a network node that maintains the optical link. Accordingly, each node will have an OLM for establishing and maintaining that particular node's optical links. The process of link adjacency discovery also serves to establish an optical link. Data such as local and remote LinkIDs, link create, wavelength, etc. is collected and stored for each link. The OLM also manages link state changes resulting from autonomous events or explicit provisioning commands.

A local link adjacency map (LLAM) represents the local view, that is the view from a particular node, of the optical topology and consists of the set of all optical links on the node. Accordingly, a LLAM will preferably be maintained in each node of the optical ring network 100. When triggered by events such as a link creation, deletion, or state change, the OLM updates the LLAM and forwards the updated data for the link to other applications for further processing. The OLM may also be responsible for handling requests to create, edit or delete optical bypass channel (OBC) segments such as express channel segments and light path segments in addition to performing auto network topology discovery.

The exemplary OLM of the present invention generally includes an optical link provisioning unit. The optical link provisioning unit is primarily responsible for processing requests related to an optical link, for example processing create link, edit link, delete link and get link requests, as well as initiating the OLAD protocol for performing auto-discovery of a link, updating the LLAM associated with link states and notifying other applications of link changes.

OLM services are provided by two types of interfaces: a service object interface and a messaging interface. Service objects handle provisioning commands for a given optical link, for example commands requesting an optical link creation, an optical link edit, or deletion of an optical link. A service object may be created for each entity type supported by the OLM and methods in the service object are invoked to execute a service request. The OLAD protocol of the present invention is preferably implemented in an object oriented programming language, for example C++ although the implementation of the OLAD protocol is not limited thereto. An OLM thread is created for servicing OLAD modification notifications and for maintaining a LLAM.

An optical link is a bi-directional optical channel segment having optical termination points at two nodes in the network. Optical links have one-to-one relationships to line-side facilities, that is each optical link is provided on a particular channel or lambda operating at a particular wavelength. An out-of-band signaling mechanism is preferably used for OLAD transmissions so that OLAD transmissions may be made according to legacy codes, for example transmissions made according to synchronous optical network standards. However, in-band signaling may be implemented for performing transmissions according to the OLAD protocol.

A primary responsibility of the OLM is to perform auto-discovery of the optical links on one or more network nodes. Auto-discovery of an optical link involves identification of a link identifier (LinkID) associated with both end points of the link. The OLAD protocol is used for this purpose.

In TABLE A, there is summarized optical link attributes implemented in an embodiment of the present invention pursuant to providing optical link topology auto-discovery. A facility identification (facID) provides a node unique identity of a facility that may be used for providing an optical link, for example the facID may designate a particular communication channel such as a port associated with a particular wavelength or lambda ($\lambda$), available for establishing an optical link. A local facility identify (srcLinkID) provides a unique identification of a local facility associated with an optical link while an echo identification (echoLinkID) provides a unique identification of a far-end facility associated with an optical link. An optical link also has an OLAD protocol state machine associated therewith identified by an optical link attribute (oladFsm) for processing OLAD transmissions. An optical link service attribute may be used to designate a specific type of service such as lightpath services, express channel services, or no service. A bandwidth attribute describes an optical rate associated with a given optical link. For example, the bandwidth may be between 2.5 and 10 gigahertz.

TABLE A

| Attribute | Type | Description |
| --- | --- | --- |
| facID | ID | ID of associated facility |
| srcLinkID | LinkID | LinkID of local facility |
| echoLinkID | LinkID | LinkID of far-end facility |
| oladFsm | OLADFsm | OLAD protocol state machine |
| service | OBCService | LP, EC, or NONE |
| bandwidth | OpticalRate | 2.5 GHz to 10 GHz |

An optical link attribute having a LinkID type uniquely identifies an end point of an optical link in the optical ring network 100. To provide end point identification uniqueness in the network, the LinkID includes two designations: a network element Internet Protocol (IP) address and a facility identity (facID). The IP address uniquely identifies a node in the network and the facID identifies the specific port associated with the link on the network node. Thus, the LinkID structure is preferably made according to TABLE B. Accordingly, an optical link can be uniquely identified by the combination of two LinkIDs, each of which is associated with a node of the link termination.

TABLE B

| IP address | Facility ID |
| --- | --- |

The OLAD protocol is a fundamental component of the optical link auto-discovery of the present invention. In a preferred embodiment, the OLAD protocol is realized in a simple format including only two fields: a source LinkID field and an echo LinkID field. The source LinkID field constitutes an announcement of the local LinkID. The echo function serves to confirm the receipt of the original announcement. The OLAD protocol is preferably transmitted using an out-of-band signaling mechanism such as the overhead in a DW. In an echo message, the LinkID of the node transmitting the echo message is written into the source field of the echo message while the LinkID, as received by the transmitting node via the announce message, of the node receiving the echo message is written into the echo field. Thus, upon receipt of the echo message, the local node, that is the node that originated the announce message, can confirm that the far end node (the node that originated the echo message) correctly received the announce message as well as the correct identity of the local node.

Figure 4:
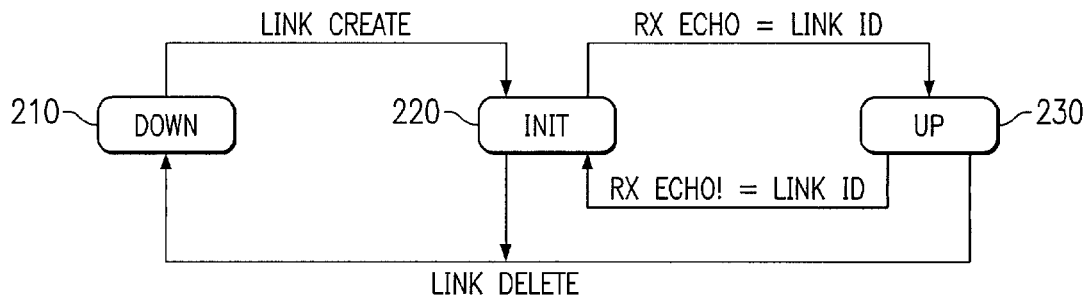
FIG. 4 is a link state diagram as provided by the optical link adjacency protocol of the present invention.

In an embodiment of the invention, the OLAD protocol also defines the link states and the transitions between these states. As illustrated in FIG. 4, an optical link can be characterized by one of three states: a DOWN state 210, an initialization (INIT) state 220 and an UP state 230. The DOWN state 210, also referred to as a "start" state for an optical link, indicates that the link facility has been decommissioned, that is the link resource, or resources, have not been allocated. The INIT state 220 indicates the link resources have been provisioned, or allocated, and are currently idle waiting for a valid echo message from the far end facility. The UP state 230 indicates an established link in a steady, usable state.

An INIT state 220 is transitioned from a DOWN state 210 by the creation of an optical link. An optical link in an INIT state 220 may be transitioned to an UP state 230 upon a successful echo message received from the far end facility, that is upon reception of a LinkID from the far end facility. An optical link in an UP state 230 will return to an INIT state 220 in the event that an echo message failure occurs.

When a link is created, the link transitions from the DOWN state 210 to the INIT state 220. Transition of a link from a DOWN state 210 to an INIT state 220 invokes the OLAD protocol to send an announce message. The OLM will write the local LinkID to the transmit (TX) sourceLinkID field prior to sending the announcement. If the receive (Rx) sourceLinkID is known, that is the LinkID of the far end node, it will be written to the TX echoLinkID field as well.

An optical link in an INIT state 220 is transitioned to an UP state 230 if the Rx echoLinkID corresponds to the TX sourceLinkID. Failure of a correspondence between the Rx echoLinkID and the TX sourceLinkID results in the link state being maintained in the INIT state 220.

Figure 5:
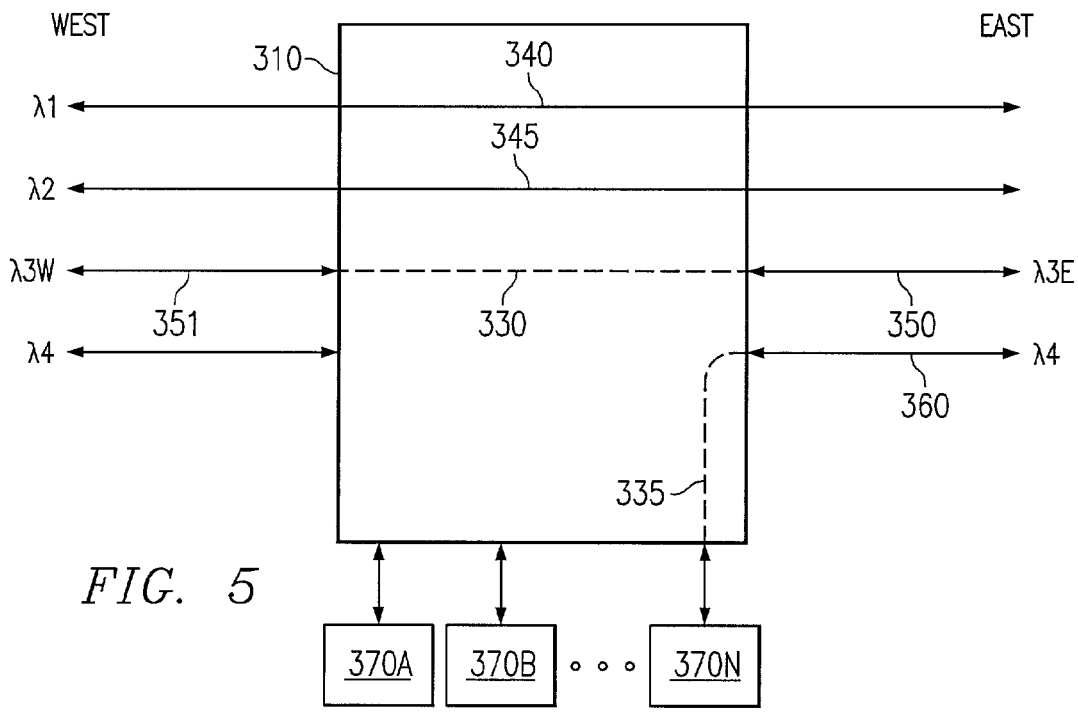
FIG. 5 is an optical network node providing a lightpath segment as well as pass-through optical links according to the invention.

FIG. 5 illustrates local node 310 having optical links 340, 345, 350, 351 and 360 and service link facilities 370–370N. Other applications may be notified of a link transition connection between two optical links on pass through nodes, for example a cross connection 330 linking optical link 351 with optical link 350 at node 310. Furthermore, optical link 335 can consist of a cross connection between optical link 360 and a service link facility 370N.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. An optical network operable to provide one or more optical links therein, the optical network including:
    a first node to terminate an optical link; and
    a second node coupled to the first node to terminate the optical link, the first node operable to initiate provisioning of the optical link between the first node and the second node by transmitting an announce message to the second node, the announce message containing a first designation used by the first node to identify the optical link, the second node generating an echo message having a second designation used by the second node to identify the optical link and the first designation, the second node transmitting the echo message to the first node.

2. The optical network according to claim 1, wherein the first designation includes a network address of the first node and a facility identifier specifying a port of the first node associated with the optical link, the second designation including a network address of the second node and a facility identifier specifying a port of the second node associated with the optical link.

3. An optical network operable to provide one or more optical links therein, the optical network including:
    a first node to terminate an optical link;
    a second node coupled to the first node to terminate the optical link, the first node operable to initiate provisioning of the optical link between the first node and the second node by transmitting an announce message to the second node, the announce message including a source field containing a designation identifying the first node, the second node generating an echo message having a designation identifying the second node written into a source field of the echo message and the designation identifying the first node being written into an echo field of the echo message, the second node transmitting the echo message to the first node;
    a first node optical link manager module; and
    a second node optical link manager module, creation of the optical link being made in response to invocation of a service object in the optical link module of the first node, a link state of the optical link transitioning from a down state to an initialized state in response to invocation of the service object, the announce message being transmitted from the first node to the second node in response to the link state transitioning to the initialized state.

4. The optical network according to claim 3, wherein the link state transitions from the initialized state to an up state when the designation in the announce message identiEying the first node matches the designation specified in the echo field of the echo message.

5. The optical network according to claim 3, wherein the service object is a link service object and the link is created by invocation of a create method of the link service object, the link service object executed by the first node optical link manager module.

6. The optical network according to claim 4, wherein the link state transitions to the down state upon invocation of a delete method of the service object.

7. The optical network according to claim 4, wherein the link state transitions to the initialized state when the designations in the source field of the announce message do not match the designations in the echo field of the echo message.

8. The optical network according to claim 1, wherein the first node is an optical transport network node.

9. The optical network according to claim 1, wherein the second node is an optical transport network node.

10. A method for provisioning an optical communication link in an optical network, comprising:
  creating at a host node a first message including a first link identifier used by the host node to identify the communication link;
  transmitting the message over the optical communication link;
  receiving at the host node a second message sent from an adjacent node the second message containing a second link identifier used by the adjacent node to identify the optical communication link and the first link identifier.

11. The method of claim 10, wherein the first message stores the first link identifier in a predefined field.

12. The method of claim 10, wherein the second message stores the first link identifier in a first predefined field and the second link identifier in a second predefined field.

13. The method of claim 10, wherein the second message includes one or more designations specifying the network resources of the second node responsible for provisioning the communication link.

14. The method of claim 10, wherein the first message includes one or more designations specifying network resources of the first node responsible for provisioning the communication link, and the second message includes one or more designations specifying the network resources of the second node responsible for provisioning the communication link.

15. The method of claim 10, further comprising transitioning a state of the optical communications link at the first node from a first state to a second state if the first link identifier is contained within a predetermined field of the second node in the second message.

16. Software stored for programming a node on an optical network that, when executed by the node, causes the node to perform a process, the process comprising:
  creating at a host node a first message including a first link identifier used by the host node to identify the communication link;
  transmitting the message over the optical communication link;
  receiving at the host node a second message sent from an adjacent node the second message containing a second link identifier used by the adjacent node to identify the optical communication link and the first link identifier.

17. The software of claim 16 wherein the first message stores the first link identifier in a predefined field.

18. The software of claim 16 wherein the second message stores the first link identifier in a first predefined field and the second link identifier in a second predefined field.

19. The software of claim 16 wherein the second message includes one or more designations specifying the network resources of the second node responsible for provisioning the communication link.

20. The software of claim 16 wherein the first message includes one or more designations specifying network resources of the first node responsible for provisioning the communication link, and the second message includes one or more designations specifying the network resources of the second node responsible for provisioning the communication link.

21. The software of claim 16 further comprising transitioning a state of the optical communications link at the first node from a first state to a second state if the first link identifier is contained within a predetermined field in the second message.

22. The optical network according to claim 1, further comprising:
  a first node optical link manager module; and
  a second node optical link manager module; wherein creation of the optical link is made in response to invocation of a service object in the optical link module of the first node, a link state of the optical link transitioning from a down state to an initialized state in response to invocation of the service object, the announce message being transmitted from the first node to the second node in response to the link state transitioning to the initialized state.

23. The optical network according to claim 22, wherein the service object is a link service object and the link is created by invocation of a create method of the link service object, the link service object executed by the first node optical link manager module.

24. The optical network according to claim 22, wherein the link state transitions from the initialized state to an up state when the first designation in the announce message matches a designation specified in a predefined field of the echo message.

25. The optical network according to claim 24, wherein the link state transitions to the down state upon invocation of a delete method of the service object.

26. The optical network according to claim 24, wherein the link state transitions to the initialized state when the first designation contained in the announce message does not match the designation in the echo field of the echo message.

* * * * *